W. J. MEIKLEHAM.
FAN BELT RETAINER.
APPLICATION FILED JULY 6, 1918.
1,313,829.
Patented Aug. 19, 1919.
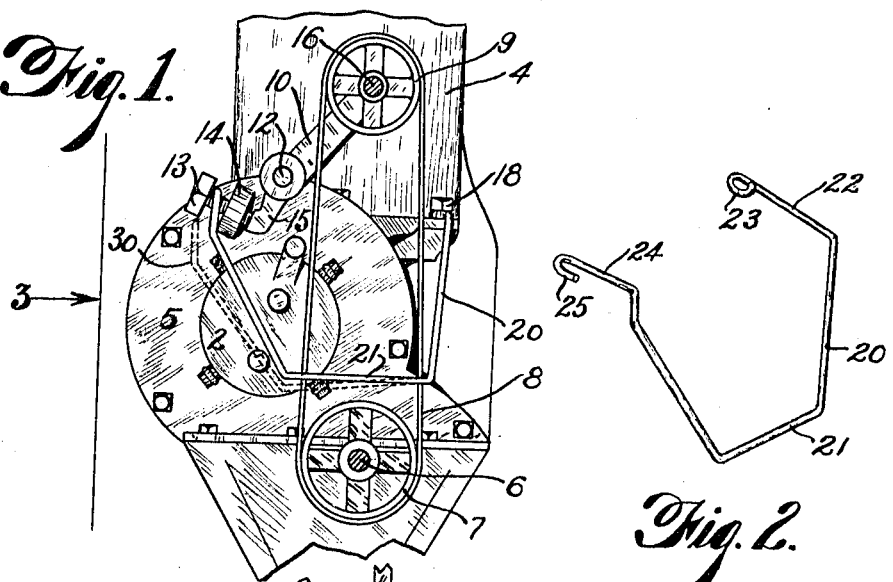
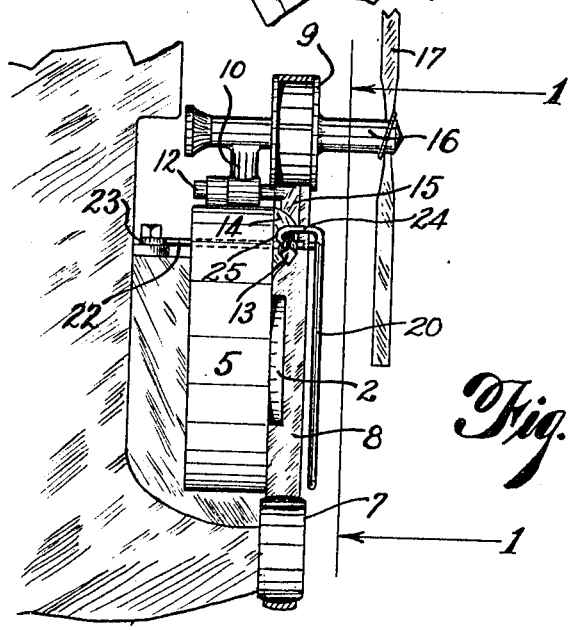
Inventor,
Wm J. Meikleham.

UNITED STATES PATENT OFFICE.

WILLIAM J. MEIKLEHAM, OF DENVER, COLORADO.

FAN-BELT RETAINER.

1,313,829.  Specification of Letters Patent.  Patented Aug. 19, 1919.

Application filed July 6, 1918. Serial No. 243,623.

*To all whom it may concern:*

Be it known that I, WILLIAM J. MEIKLE-HAM, citizen of the United States, residing at the city and county of Denver and State of Colorado, have invented certain new and useful Improvements in Fan-Belt Retainers; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to devices for retaining in position fan belts of automobiles, the object being to prevent accidental displacement of a belt and at the same time to permit removal of the belt or removal of the timer without entirely detaching the retainer.

Briefly the invention comprises a spring wire member having an eye in one end by means of which it is bolted to the engine casing, an intermediate U-shaped portion to engage the belt adjacent the round-faced pulley and a hook on the other end to engage over the belt tensioning screw, the set of the spring member being sufficient to retain the hook in position.

Referring to the drawings:

Figure 1 is a front elevation, as indicated by line 1—1 of Fig. 3, of a portion of a motor with the commutator casing and timer, showing the retainer applied.

Fig. 2 is a perspective of the retainer.

Fig. 3 is a side elevation taken on line 3—3, of Fig. 1.

A cylinder head 4, a commutator casing 5 and a timer 2 are shown together with crank shaft 6 and round-faced belt pulley 7. Belt 8 extends over the pulley 7 and over an adjustable grooved pulley 9 supported on the long arm 10 of the belt-tightening lever which is pivoted on the casing at 12. A tensioning screw 13 threaded in lug 14 acts on the short arm 15 of the lever to properly tension the belt. Shaft 16 of pulley 9 carries the usual fan 17.

The retainer comprises a spring wire member having an approximately U-shaped body portion 20 whose transverse bar 21 engages the two runs of the belt adjacent pulley 7 when in operative position. An arm 22 extends from the upper end of one side of the body portion at right angles to the plane of the body and is provided with an eye 23 by means of which the device is connected to the casing by a bolt 18. A similarly positioned short arm 24 extends from the other side of the body and is provided with a hook 25 which is adapted to engage over screw 13 which always projects sufficiently to afford a seat for said hook.

The set of the retainer is such that when hook 25 engages screw 13 it is under tension. When disengaged from screw 13 it would normally take the position 30 as indicated by dotted lines.

By this arrangement when it is necessary to gain access to either the belt or the timer for inspection, repair or removal thereof, it is necessary merely to unhook the arm 24 from the screw 13 and swing the retainer around on bolt 18 as a pivot. But, when the arm 24 is hooked up in operative position, the belt will be effectually retained on the round-faced pulley 7 by transverse bar 21.

This is a marked advantage over forms of retainers which comprise bars having both ends securely bolted to the casing and requiring the removal of at least one if not both bolts in order to gain ready access to the belt.

Not only does the present invention retain the belt in operative position, but it increases the life of the belt which is damaged more or less every time it slips off the pulley 7.

It will be understood that pulley 7 is round-faced so that the belt may be slipped snugly thereon after having been fitted into the groove of pulley 9, which snug fit would not be obtained if both pulleys were grooved.

What I claim is:

1. A fan belt retainer comprising a spring member having a U-shaped body, a long arm at right angles thereto having an eye adapted to be pivotally connected to a motor casing, and a short arm with a hook thereon adapted to engage a belt tensioning screw.

2. A fan belt retainer comprising a spring member having an arm adapted to be pivotally connected to a motor structure and a short arm provided with a hook to detachably engage the motor structure.

3. A fan belt retainer comprising a member having a U-shaped body and arms projecting therefrom at right angles, one arm being adapted to be pivotally connected with the motor structure and the other arm having a hook to detachably engage the structure.

4. The combination with a motor casing, fan belt and belt tensioning screw, of a belt retainer comprising a spring member having a U-shaped body and arms extending from each side of said body at right angles thereto, one arm being long and having an eye bolted to the motor casing, the lower portion of the U-shaped body engaging both runs of the belt, the other arm being short and having a hook engaging over the belt tensioning screws.

5. The combination with a motor casing, associated structure and fan belt, of a retainer comprising a spring member having a portion engaging the runs of the belt, an arm pivotally connected to the motor casing and an arm having a hook detachably engaged with the structure.

6. The combination with a motor casing, associated structure and fan belt, of a retainer comprising a member having a portion engaging the runs of the belt, an arm connected to the motor casing and an arm having a part detachably engaged with the structure.

In testimony whereof I affix my signature.

WILLIAM J. MEIKLEHAM.

Copies of this patent may be obtained for five cents each, by addressing the "Commissioner of Patents, Washington, D. C."